Jan. 13, 1931.  M. W. MOESTA  1,789,109

MEANS FOR JOINING METAL PANELS

Filed Dec. 27, 1927

INVENTOR
MARVIN W. MOESTA.
BY
ATTORNEY

Patented Jan. 13, 1931

1,789,109

UNITED STATES PATENT OFFICE

MARVIN W. MOESTA, OF DETROIT, MICHIGAN, ASSIGNOR TO THE MURRAY CORP. OF AMERICA, A CORPORATION OF DELAWARE

MEANS FOR JOINING METAL PANELS

Application filed December 27, 1927. Serial No. 242,639.

One of the objects of my invention is to provide simple and easily applied means for securing instrument panels in vehicle bodies.

With this and other objects in view, my invention consists in the arrangement, combination and construction of the various parts of my improved device, as described in the specification, claimed in my claims and shown in the accompanying drawing, in which:

Figure 2:
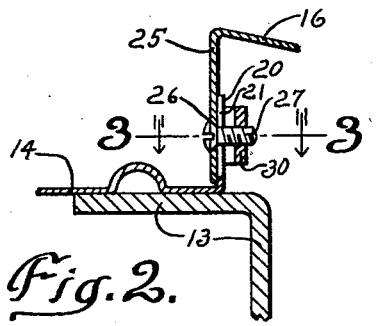
Fig. 2 is a detail in section showing the instrument panel joined to the cowl panel and illustrating the application of my invention.
Figure 1:
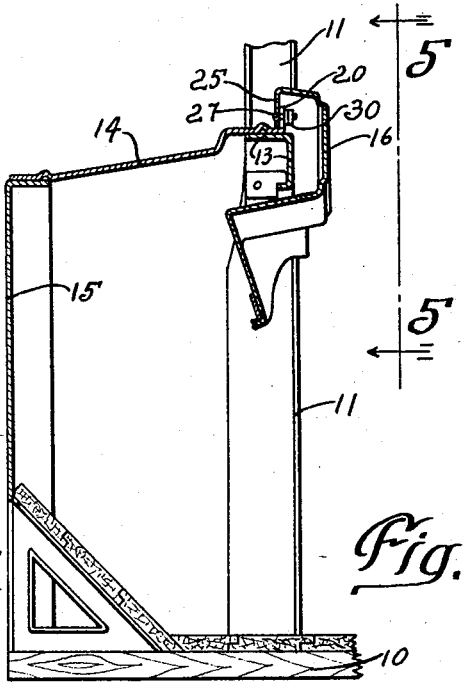
Fig. 1 is a sectional view of the forward end of an automobile body showing the application of my invention.
Figure 3:
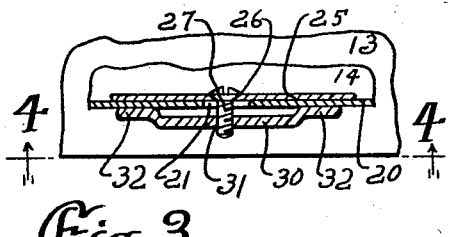
Fig. 3 is a section taken on line 3—3 of Fig. 2.
Figure 4:
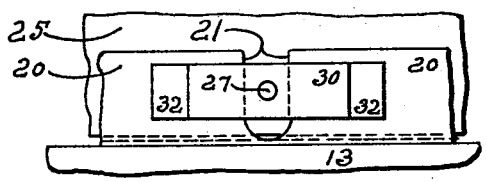
Fig. 4 is a section taken on line 4—4 of Fig. 3.
Figure 5:
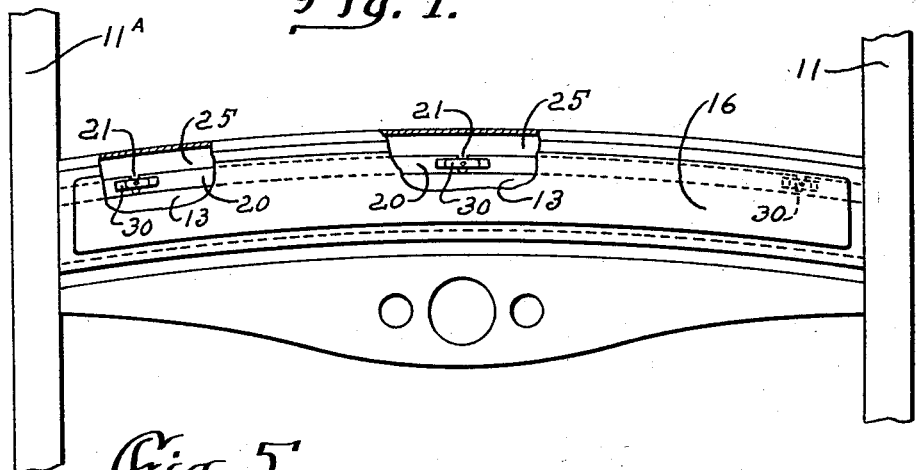
Fig. 5 is an elevation of the instrument panel having parts broken away to show the points of attachment to the cowl panel.

In Fig. 1 I have shown a sectional part of the forward end of a vehicle body comprising the sill member 10, a front pillar member 11 of metal, a cowl bar or support 13 which extends between the pillar 11 and its mate 11—a (Fig. 5) on the opposite side of the body, a cowl panel 14 and a dash panel 15 and an instrument panel 16. The rear upper edge of the cowl panel 14 rests upon and is supported by the cowl bar 13 and is secured thereto preferably by spot welding. An upwardly extending flange 20 is formed upon the rear upper edge of the cowl panel 14 and slots 21 are cut in the flange at spaced intervals as shown in Figs. 4 and 5. The upper edge of the instrument panel 16 is formed with a downwardly extending flange 25 in which are formed a plurality of apertures 26 through which screw bolts 27 may be inserted. The apertures 26 are positioned to align with the slots 21. The slots 21, however, are considerably larger than the apertures 26 so that the alignment may be easily made. The screw bolts 27 are inserted through the apertures 26 and on the inner ends of the screw bolts the bars 30 are threadably engaged. These bars 30 each have a threaded opening 31 in their central portion adapted to engage the end of the bolts 27 and have offset portions 32 on their ends.

In attaching the instrument panel 16 to the cowl panel 14 the bolts 27 are positioned in the apertures 26, and the bars 30 attached to the ends of the bolts 27 with the offset portions 32 extending toward and spaced from the flange 25. The flange 25 is then slid down past the outside of the flange 20 on the cowl panel 14 so that the shanks of the bolts 27 drop into the slots 21 with the bars 30 on the inside of the cowl panel flange 20 and bridging the slots 21. The bolts 27 may be then turned by means of a tool applied to the slotted heads thereof to draw the offset ends 32 of the bars 30 tightly against the inner surface of the flange 20, on each side of the slots 21. The bars 30 are of sufficient length so that their ends will strike against the cowl bar 13 and prevent them from turning with the bolts 27. The instrument panel shown in Fig. 1 also acts as a molding over the cowl bar and as a stop for the bottom edge of the windshield, which is not shown and has its ends removably secured by screws or other suitable means (not shown) to the pillars 11 and 11a. It is desirable that the instrument panel be removably secured in place so that it may be removed to permit the repair or replacement of instruments and it is also desirable that the fastening means do not appear on the face of the panel.

It has been found impractical to secure the flanges together by inserting ordinary bolts or screws in holes drilled in the panels before assembling because it is difficult to align the holes in the flanges after the panels are in position to be joined together. Such methods therefore require additional drilling and tapping of the holes after the panels are in position and consequently increase the number of operations in the assembly and raise the cost of production. My invention, as hereinabove described, provides an easy and efficient means for attaching the panels together requiring a minimum of time and labor, since the holes and slots may be formed in the panels before they are assembled in position to be joined together and the holes need not be threaded. The quality of the assembly work is therefore increased and the time necessary to effect the assembly operation is materially shortened with the resulting economies in operation.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In an automobile body construction, a pair of forward upright pillars, a cowl bar extending between and secured to said pillars, a metal cowl panel having its rear portion secured to said cowl bar and having an upwardly extending flange on its upper rear edge with notches therein, a metal instrument panel having a downwardly extending flange on its upper edge with apertures therein, said instrument panel flange being adapted to abut against said cowl panel flange with said apertures in alignment with said notches, means for securing said instrument panel flange to said cowl panel flange comprising screw bolts positioned in said apertures with their heads on the outside of said instrument panel flange and their shanks extending through said notches, bar members threadably engaging the inner ends of said screw bolts and having offset end portions bearing against said cowl panel flange on the side opposite to said instrument panel flange.

2. In an automobile body construction, a pair of forward upright pillars, a cowl bar extending between and secured to said pillars, a metal cowl panel having its rear upper portion secured to the upper surface of said cowl bar and having a notched upwardly extending flange formed on its rear upper edge, a metal instrument panel having an apertured downwardly extending flange formed on its upper edge adapted to abut against the upwardly extending flange on said cowl panel with its apertures in alignment with the notches in said cowl panel, bolts in the apertures in said instrument panel flange extending through the notches in said cowl panel flange, bar members having offset end portions threadably engaging said bolt members and positioned with said offset end portions bearing against said cowl panel flange on each side of said notches.

3. In automobile body construction, a pair of forward upright pillars, a cowl bar extending between and secured to said pillars, a metal instrument panel extending between and secured to said pillars and having a downwardly extending apertured flange formed on its upper edge and positioned above said cowl bar, a metal cowl panel having its upper rear portion secured to said cowl bar and having an upwardly extending flange with notches therein formed on its rear upper edge, said cowl panel flange being positioned to abut against said instrument panel flange and said notches being of substantially greater width than the diameter of the apertures in said instrument panel flange and thereby adapted to align easily with said apertures, means for securing said instrument panel flange and said cowl flange together comprising screw bolts extending through said aligned apertures and notches, bar members threadably engaging the threaded ends of said bolts and bridging said notches.

4. In automobile body construction, a pair of forward upright pillars, a cowl bar extending between and secured to said pillars, a metal instrument panel extending between and secured to said pillars and having a downwardly extending apertured flange formed on its upper edge and positioned above said cowl bar, a metal cowl panel having its rear portion secured to said cowl bar and having an upwardly extending flange with notches therein formed on its rear edge, said cowl panel flange being positioned to abut against said instrument panel flange with the notches therein aligning with the apertures in said instrument panel flange, means for securing said instrument panel flange to said cowl panel flange comprising bolts extending through said aligned apertures and notches, and nut members engaging the threaded ends of said bolts and bridging said notches.

5. In automobile body construction, a cowl panel having a notched flange on its rear edge, an adjoining panel having a channel formation in one edge enclosing said cowl panel flange and with its terminal flange abutting said cowl panel flange, means for securing said panels together comprising bolts extending through apertures in said adjoining panel flange and the notches in said cowl panel flange, and nut members positioned within said channel engaging said bolts and bridging said notches.

MARVIN W. MOESTA.